(12) United States Patent
Mishra Gupta et al.

(10) Patent No.: US 12,554,856 B2
(45) Date of Patent: Feb. 17, 2026

(54) DETECTING SECURITY VULNERABILITIES ASSOCIATED WITH SOFTWARE ARTIFACTS HOSTED BY PODS

(71) Applicant: International Business Machines Corporation, Armonk, NY (US)

(72) Inventors: Shachee Mishra Gupta, Gurgaon (IN); Ashok Pon Kumar Sree Prakash, Bangalore (IN); Abhishek Jain, Pune (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 18/115,101

(22) Filed: Feb. 28, 2023

(65) Prior Publication Data

US 2024/0289463 A1 Aug. 29, 2024

(51) Int. Cl.
| | |
|---|---|
| G06F 21/71 | (2013.01) |
| G06F 8/61 | (2018.01) |
| G06F 21/55 | (2013.01) |
| G06F 21/57 | (2013.01) |
| G06F 21/74 | (2013.01) |
| G06F 21/51 | (2013.01) |
| G06F 21/56 | (2013.01) |

(52) U.S. Cl.
CPC ............ *G06F 21/577* (2013.01); *G06F 8/61* (2013.01); *G06F 21/554* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 11,151,024 B2* | 10/2021 | Hwang | .............. | G06F 11/3024 |
| 11,188,450 B2* | 11/2021 | Khan | .......................... | G06F 8/63 |
| 11,288,178 B2* | 3/2022 | Benes | ................. | G06F 9/45558 |
| 11,463,478 B2* | 10/2022 | Nadgowda | ............... | G06F 8/71 |
| 11,556,315 B2* | 1/2023 | Fontecilla | ............. | G06F 3/0481 |
| 2018/0300220 A1* | 10/2018 | Agarwal | .................... | G06F 8/75 |
| 2018/0300499 A1* | 10/2018 | Agarwal | .................... | G06F 8/60 |
| 2019/0260716 A1 | 8/2019 | Lerner | | |
| 2022/0129539 A1 | 4/2022 | Walsh et al. | | |

(Continued)

FOREIGN PATENT DOCUMENTS

| | | |
|---|---|---|
| CN | 106716432 A | 5/2017 |
| CN | 106746432 A | 5/2017 |

(Continued)

OTHER PUBLICATIONS

PACED: Provenance-based Automated Container Escape Detection. Abbas. IEEE. (Year: 2022).*

(Continued)

*Primary Examiner* — Venkat Perungavoor
(74) *Attorney, Agent, or Firm* — CHIP LAW GROUP

(57) ABSTRACT

An example operation may include one or more of determining that a software artifact hosted by a pod within a cluster of a host platform contains code that is a security vulnerability, identifying a function within the software artifact that requests the code, activating a filter within the pod of the host platform which prevents execution of the function within the software artifact, and installing a fix for the security vulnerability within the software artifact.

11 Claims, 12 Drawing Sheets

(56) References Cited

U.S. PATENT DOCUMENTS

| | | | |
|---|---|---|---|
| 2022/0156380 A1 | | 5/2022 | Pradzynski et al. |
| 2022/0269790 A1 | | 8/2022 | Rajana et al. |
| 2022/0337618 A1 | | 10/2022 | Shemer et al. |
| 2024/0289463 A1 | * | 8/2024 | Mishra Gupta ....... G06F 21/577 |

FOREIGN PATENT DOCUMENTS

| | | | |
|---|---|---|---|
| CN | 109313687 A | | 2/2019 |
| CN | 110795128 A | | 2/2020 |
| CN | 114968470 | * | 8/2022 |
| CN | 114968470 A | | 8/2022 |
| WO | 2024/180382 A1 | | 9/2024 |

OTHER PUBLICATIONS

XI Commandments of Kubernetes Security: A Systematization of Knowledge Related to Kubernetes Security Practices. Shamin. IEEE. (Year: 2020).*

An Empirical Analysis of Practitioners' Perspectives on Security Tool Integration into DevOps. Rajapakse. ACM. (Year: 2021).*

Qiao et al., Intelligent Container Reallocation at Microsoft 365, Jul. 2021, Conference: The ACM Joint European Software Engineering Conference and Symposium on the Foundations of Software Engineering (ESEC/FSE)At: Athens, Greece.

International Search Report issued in the International Application No. PCT/IB2023/0615, mailed on Jul. 8, 2024.

* cited by examiner

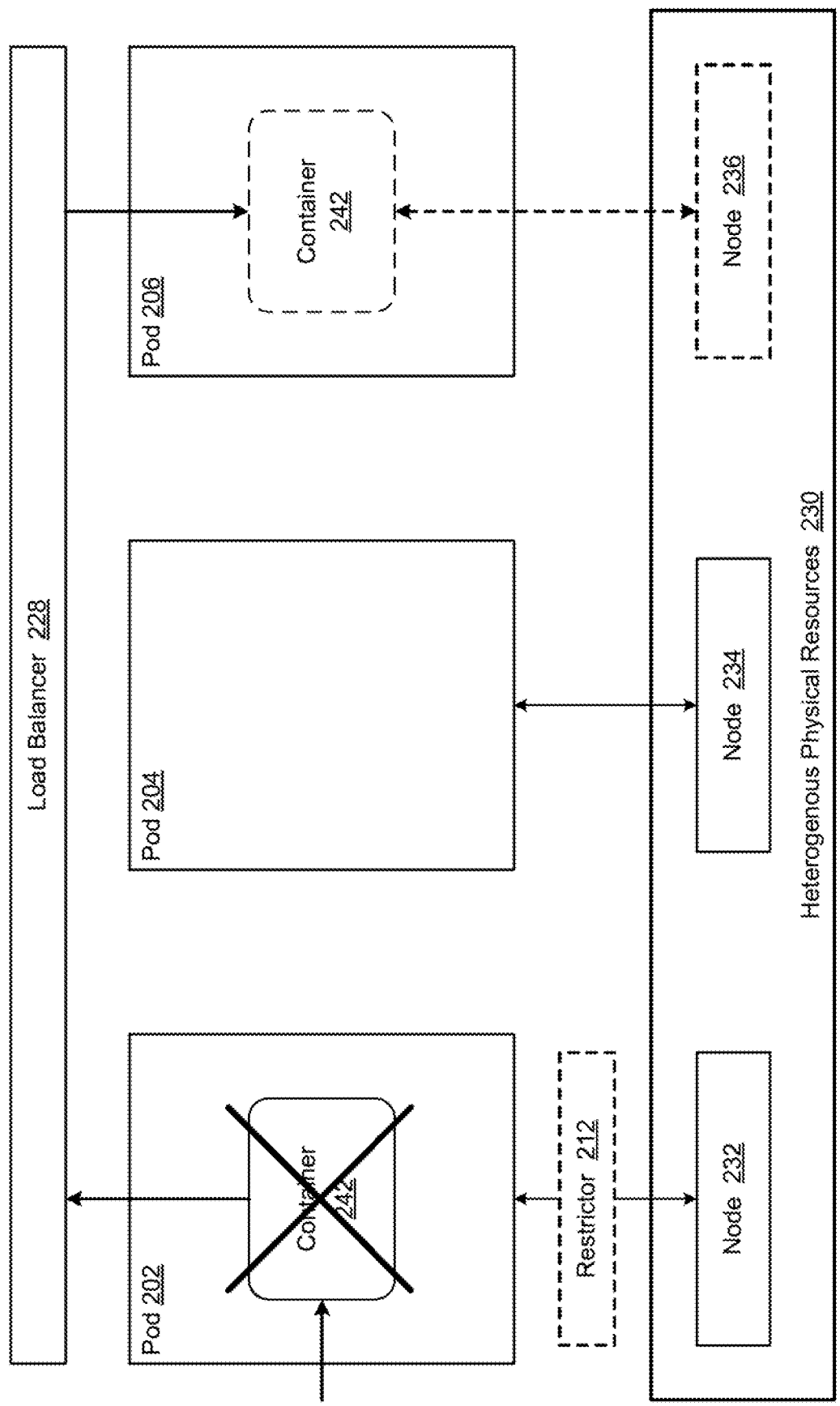

370

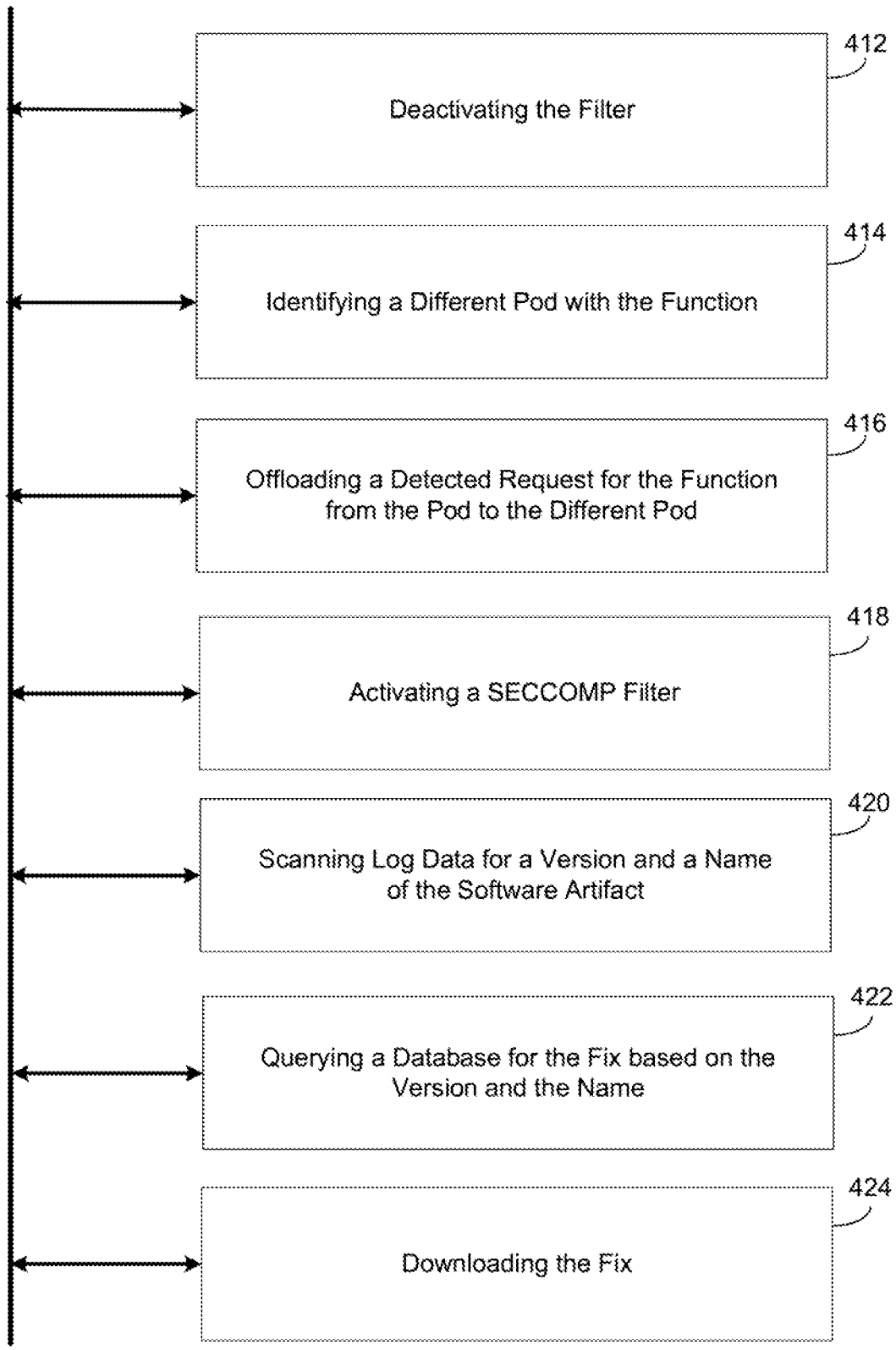

DETECTING SECURITY VULNERABILITIES ASSOCIATED WITH SOFTWARE ARTIFACTS HOSTED BY PODS

BACKGROUND

Pods contain data that may be utilized when executing various software applications.

SUMMARY

One example embodiment provides an apparatus that includes a processor configured to perform one or more of determine that a software artifact hosted by a pod within a cluster of a host platform contains code that is a security vulnerability, identify a function within the software artifact that requests the code, activate a filter within the pod of the host platform which prevents execution of the function within the software artifact, and install a fix for the security vulnerability within the software artifact.

Another example embodiment provides a method that includes one or more of determining that a software artifact hosted by a pod within a cluster of a host platform contains code that is a security vulnerability, identifying a function within the software artifact that requests the code, activating a filter within the pod of the host platform which prevents execution of the function within the software artifact, and installing a fix for the security vulnerability within the software artifact.

A further example embodiment provides a computer-readable storage medium comprising instructions, that when read by a processor, cause the processor to perform one or more of determining that a software artifact hosted by a pod within a cluster of a host platform contains code that is a security vulnerability, identifying a function within the software artifact that requests the code, activating a filter within the pod of the host platform which prevents execution of the function within the software artifact, and installing a fix for the security vulnerability within the software artifact.

BRIEF DESCRIPTION OF THE DRAWINGS

FIGS. 2B-2D are diagrams illustrating a process of modifying a vulnerable pod, according to example embodiments.

FIG. 4B is a diagram illustrating a method of modifying a vulnerable pod within a cluster on a host platform according to other example embodiments.

DETAILED DESCRIPTION

Figure 1:
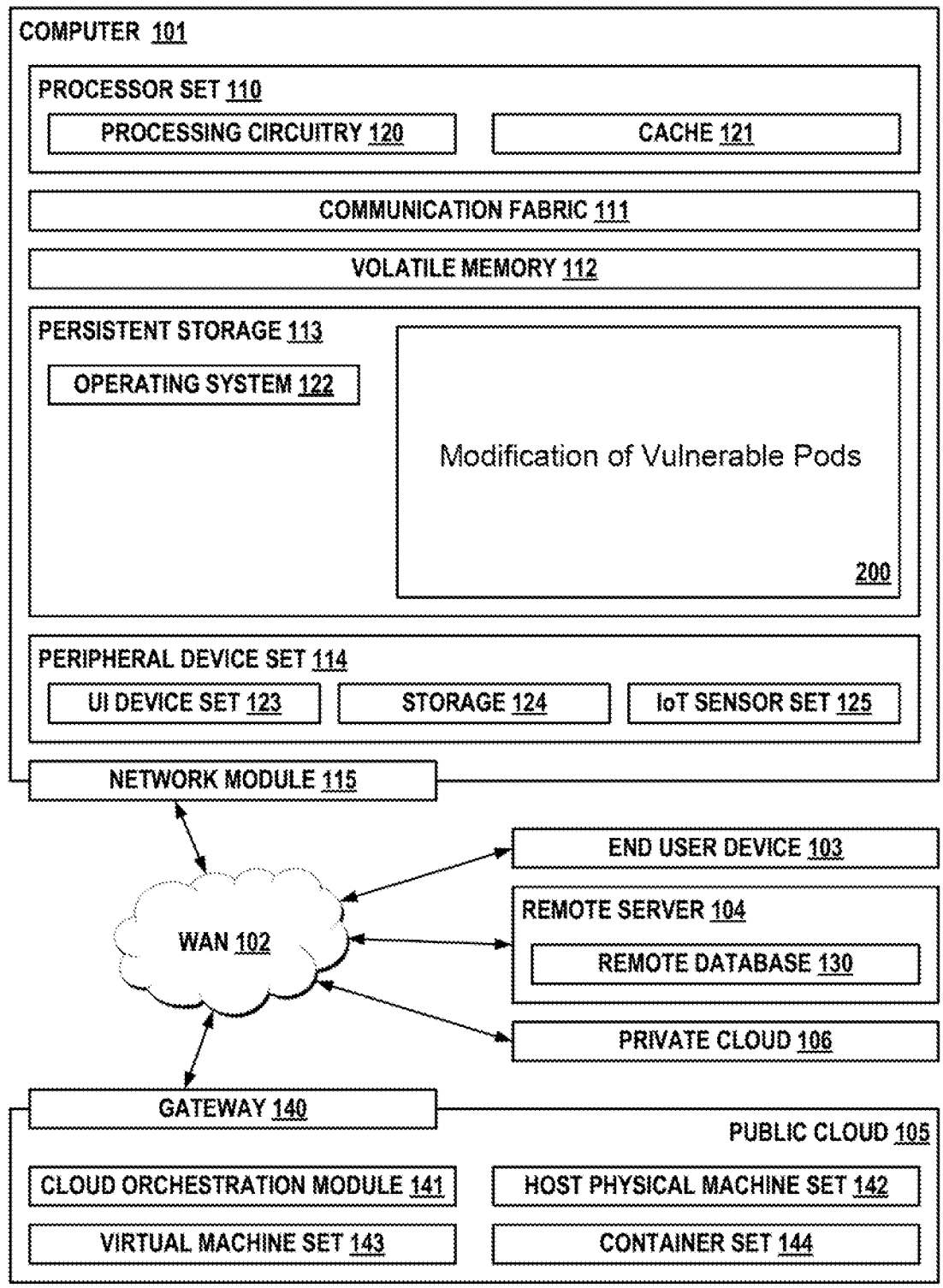
FIG. 1 depicts a computing environment, according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a host platform, such as a server that runs containerized applications. Such a platform can include a KUBERNETES® cluster, that can modify vulnerable pods to prevent security vulnerabilities from being exploited. For example, a pod can be modified to prevent a software application running therein from accessing a function that calls or otherwise interacts with code that is identified as a software vulnerability. The process is proactive in that it does not wait for an unauthorized breach to modify the vulnerable pod, but rather, finds the software vulnerability and configures and activates a filter in advance.

With the filter activated, the host platform can attempt to fix the software vulnerability without being concerned about the vulnerable code being executed. For example, the host platform may download a patch or other update and fix the software vulnerability. When the fix is installed, the host platform can remove the previously applied filter and enable the software application to resume access to the code since it is no longer vulnerable.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, a computing environment 100 is depicted. Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the inventive methods, such as modification of vulnerable pods 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric comprises switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that are now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Finding software related vulnerabilities can be very difficult as they are often detected when unauthorized access to the software is attempted. Keeping track of necessary fixes and patches to address these vulnerabilities can be cumbersome, especially when multiple operating systems and runtime environments are present.

Figure 2A:
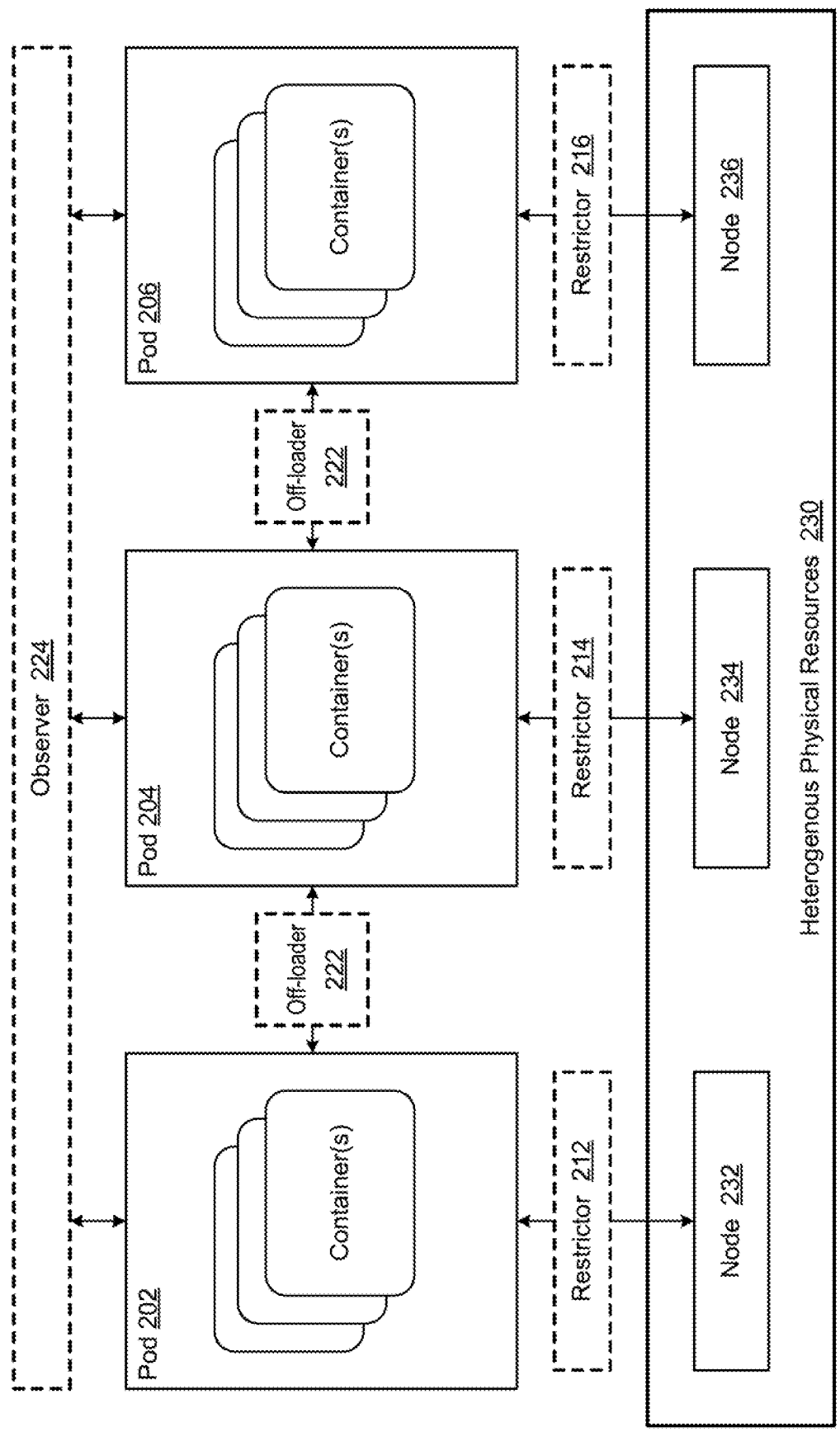
FIG. 2A is a diagram illustrating a host platform that can modify vulnerable pods, according to example embodiments.

FIG. 2A illustrates a host platform 200 that can modify vulnerable pods according to example embodiments. As an example, the host platform 200 may be a web server, a cloud platform, a distributed system, or the like. In one example, the host platform 200 is a container system (such as a KUBERNETES® cluster). Referring to FIG. 2A, the host platform 200 includes a plurality of pods 202, 204, and 206, disposed within a same cluster of the host platform 200. The pods 202, 204, and 206 may host containerized applications. For example, each pod may contain one or more containerized applications and other software artifacts including libraries and the like.

The pods 202, 204, and 206 are hosted by a system of heterogenous physical resources 230. For example, the heterogenous physical resources 230 may include a node 232, a node 234, and a node 236. The nodes 232, 234, and 236 may include different operating system versions, different types of operating systems, different libraries, different applications, and the like.

According to various embodiments, an observer 224 may access data stored inside the pods 202, 204, and 206, such as log data, runtime behavior data, container images, and the like. Through this process, the observer 224 may read software package details from a container image and/or the log and other data stores within the pod including the names and/or version identifiers of the software artifacts that are running inside a pod. The observer 224 may compare software package details (e.g., name, version, etc.) to third-party resources or to internally generated resources which identify current security vulnerabilities of such software applications based on version and name. As another example, the observer 224 may call a security scanning program to scan the code of the software artifacts (e.g., taken from the container images, etc.) for security vulnerabilities.

The host platform 200 may also apply a restrictor 212, 214, or 216 to the pods 202, 204, or 206, respectively, to prevent access to the vulnerable parts of the software artifact. For example, if a function within a software artifact hosted in pod 202 is identified as being vulnerable, the host platform 200 may apply the restrictor 212 to the identified function of the software artifact which changes a state of the software artifact and prevents the function from being called. The restrictor 212 may not be applied to all functions of the software artifact or all software artifacts of the pod 202, but rather, the restrictor 212 may be applied in a more fine-grained manner to only prevent the particular function within the software artifact from being called/executed while allowing other functions within the software artifact to continue operating uninterrupted.

The host platform 200 may also include an off-loader 222 that is configured to identify other pods within the cluster of the host platform 200 that can satisfy requests for the function that has been restricted/deactivated as a result of the restrictor being applied. When another pod is identified, the pod can be used for purposes of offloading. For example, a request for the vulnerable function in pod 202 can be offloaded to another pod (e.g., the pod 204 or the pod 206) for processing without vulnerabilities.

The observer 224 and the off-loader 222 may be part of a host process that runs in the background of the cluster of the host platform 200. The observer 224 may be configured to scan runtime data and other behavior data such as logs (e.g., via a scanner installed via a library or accessible from an external source) to identify system calls and the like to different functions within a software artifact. Thus, the observer 224 can identify which functions are called by the software artifact. When a vulnerable function is detected, the observer 224 can map it to the software artifact and use a restrictor to restrict access to the function within the software artifact. For example, the scanner may perform static analysis on the code to identify reachable functions for each request. When a vulnerability is discovered, the functions can be backtracked to identify workload functionality that could be impacted by the vulnerability.

As an example, the restrictor may be a secure computing (SECCOMP) filter that can be applied to the kernel of the pod and enables the software artifact to transition into a secure state where it cannot make any calls other than a few predefined calls (e.g., exit, return, read, write, etc.) Should it attempt other system calls, the filter will block it. In order to set the SECCOMP filter, the host platform may issue a predefined command. SECCOMP filtering allows a process to specify a filter for incoming system calls. The filter is expressed as a Berkeley Packet Filter (BPF) similar to socket filters, except the data operated on is related to the system call being made. This allows for expressive filtering of the system using a filter programming language.

Figure 2B:
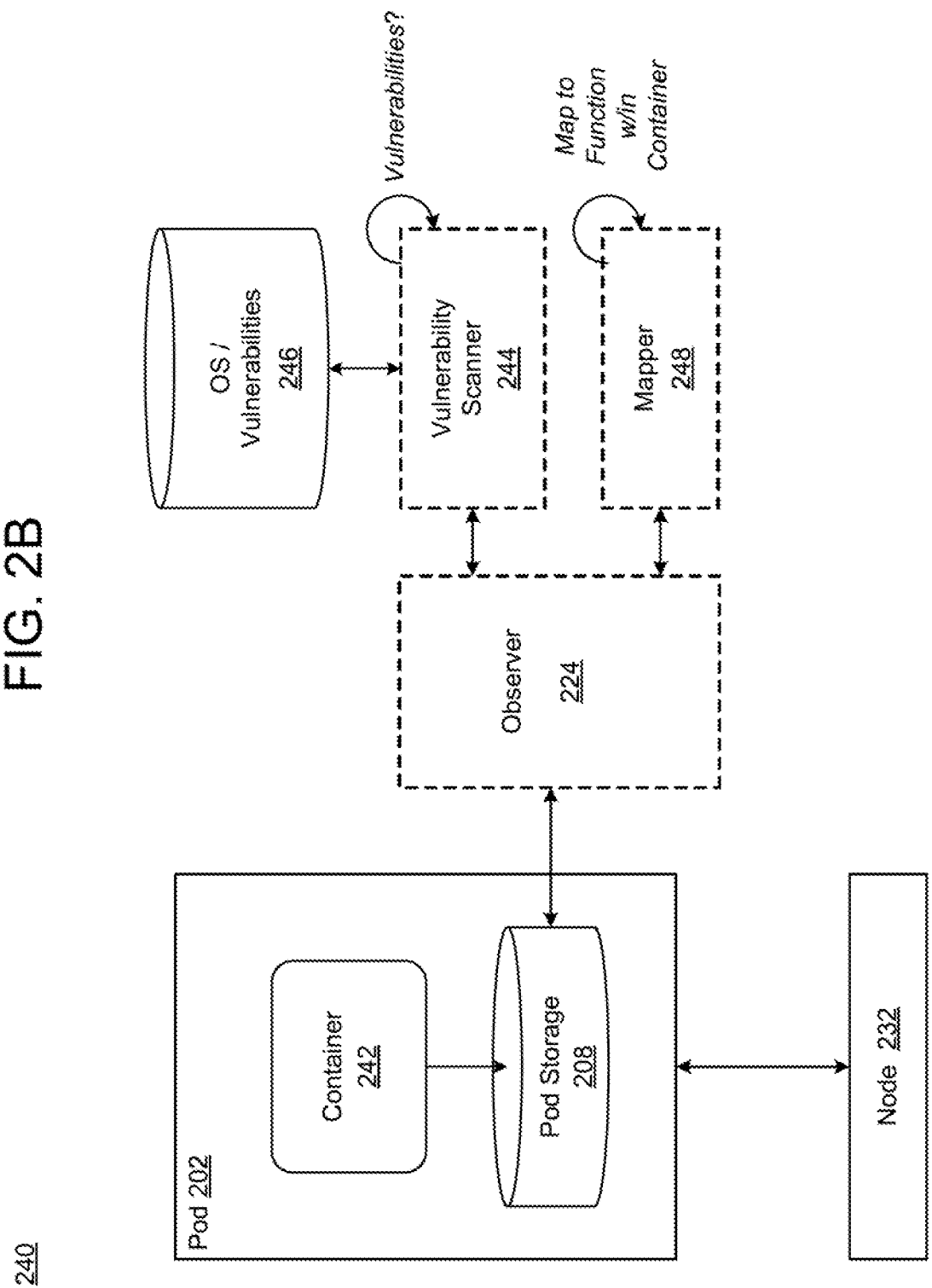
Figure 2C:
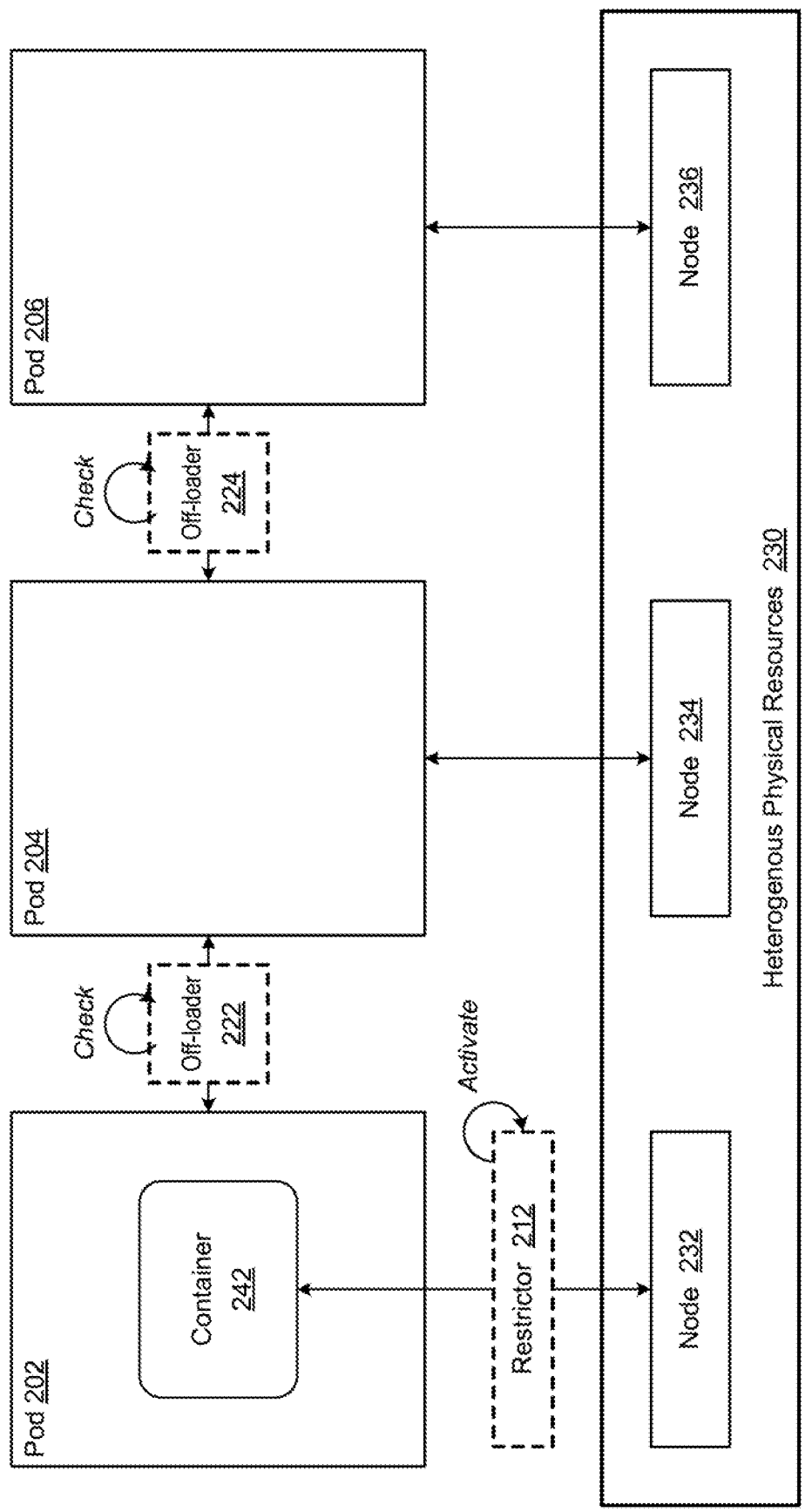

FIGS. 2B-2D illustrate a process of modifying a vulnerable pod according to example embodiments. For example, FIG. 2B illustrates a process 240 of reading a container image from a pod storage 208 of the pod 202 and scanning code within the container image for security vulnerabilities. Referring to FIG. 2B, the observer 224 may pull a container image from the pod storage 208 such as a repository or other volume of storage within the pod 202. The observer 224 may forward the code to a vulnerability scanner application 244 which scans the code for vulnerabilities based on a vulnerability database 246 that may include the current vulnerabilities for named software artifacts (applications, libraries, etc.) and versions thereof.

When a vulnerability is detected, a mapper 248 may identify which function within the software artifact is affected by the vulnerability. For example, understanding which process performs which operations (read, write, etc.) within the software artifact that are affected by the vulnerability can be performed. Here, the host platform 200 may prevent the software vulnerability from being exploited. For example, FIG. 2C illustrates a process 250 of the host platform 200 activating a restrictor 212 in response to detecting the vulnerability with a software artifact in the container 242 hosted inside the pod 202. The restrictor 212 may be narrowly tailored to the function or functions of the software artifact that are affected by the vulnerability while allowing other functions to continue to operate uninterrupted.

In addition, the host platform 200 may trigger an off-loader 222 function to attempt to find another pod within the cluster that can handle requests for the deactivated/restricted function within the container 242 in the pod 202. Here, the off-loader 222 may be integrated within or otherwise coupled to a load balancer 228 (shown in FIG. 2D) which can help identify which pods have availability and which can handle the same functionality. In this example, the off-loader identifies pod 206 as being able to serve the requests for the function of the software artifact within the container 242 that are restricted.

FIG. 2D illustrates a process 260 of forwarding requests from the pod 202 to the pod 206 based on the restrictor 212 being set in accordance with example embodiments. Referring to FIG. 2D, the host platform 200 may detect a request being received by the pod 202 for the restricted functionality within the container 242 hosted within the pod 202. In this example, the container 242 (and the function) are restricted by the restrictor 212 due to the identified vulnerability.

Accordingly, when requests for the function are received, the off-loader 222 may prevent the requests from being processed within the pod 202 and forward the requests for further processing to the pod 206, as shown in FIG. 2D. In this example, the load balancer 228 may forward the request to the pod 206 for processing while preventing the pod 202 from handling the request due to the restrictor 212 being in place. The host platform 200 may also download and install a fix to patch or otherwise address the security vulnerability detected within the software artifact of the pod 202. When the fix is installed, the host platform 200 may withdraw or otherwise remove the restrictor 212 and enable the software artifact to process the function in an unrestricted manner.

Figure 3A:
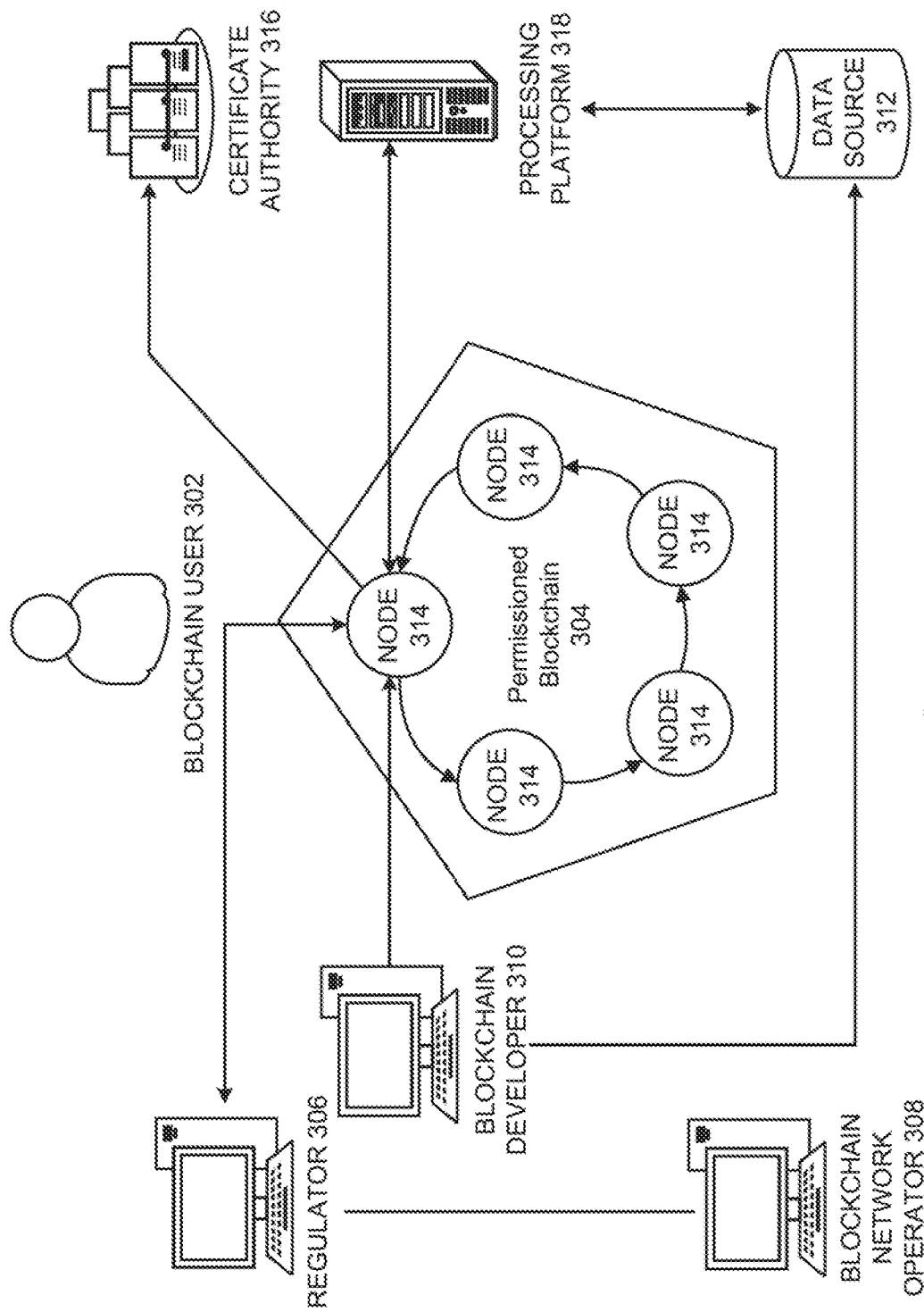
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
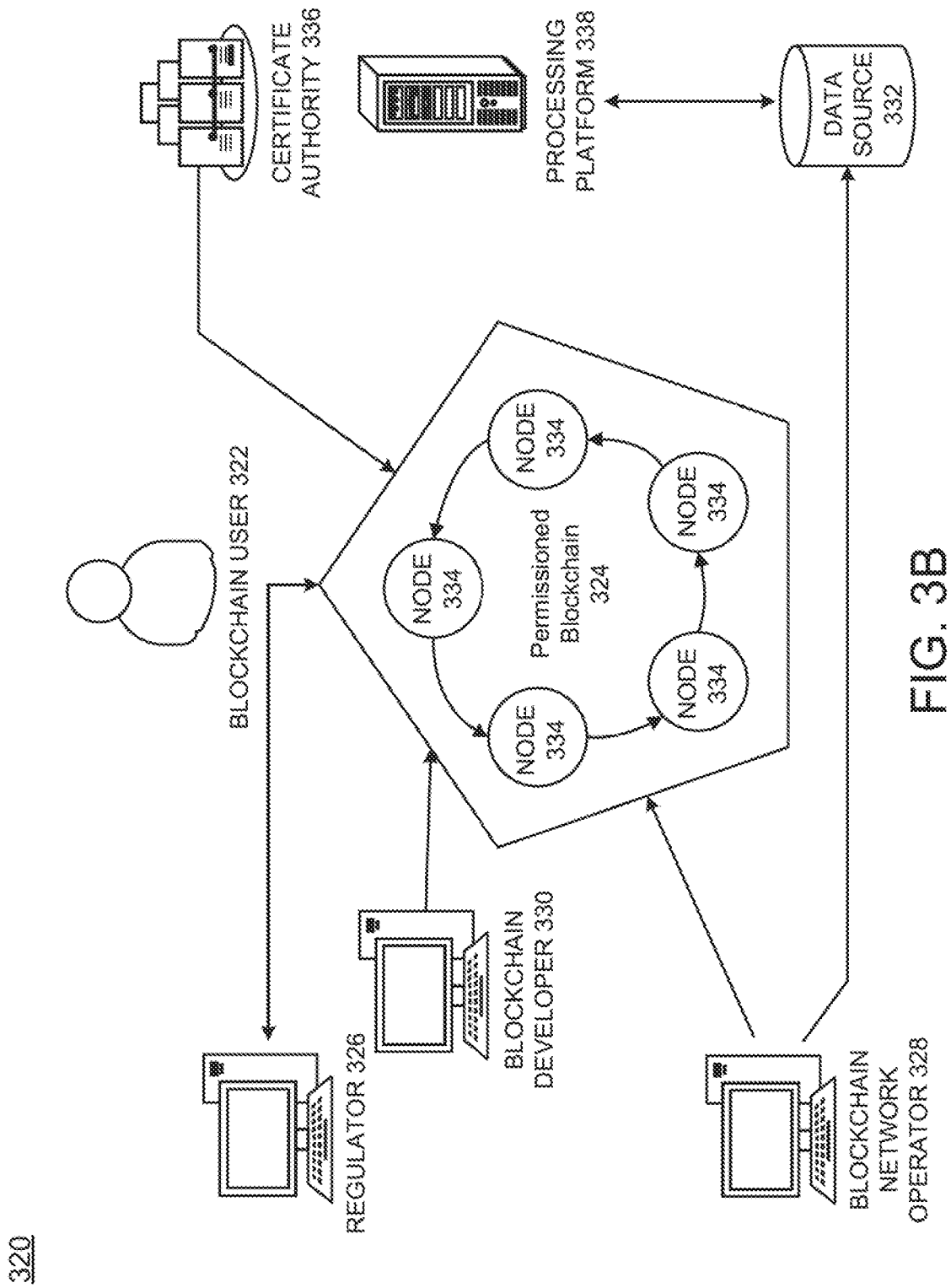
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain a user may create a personal address and begin interacting with the network by submitting transactions and hence adding entries to the ledger. Additionally, all parties have the choice of running a node on the system and employing the mining protocols to help verify transactions.

Figure 3C:
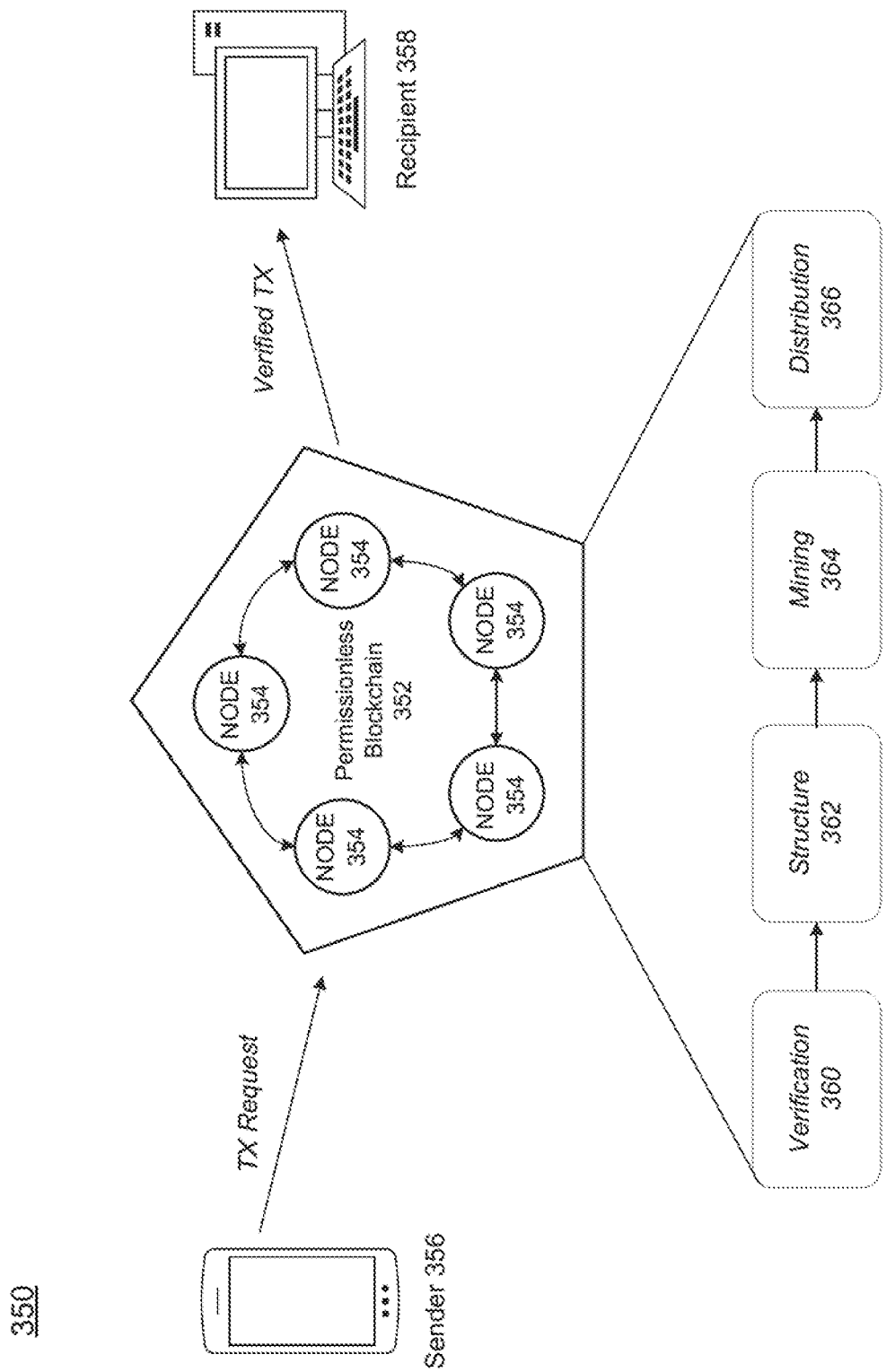
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the POW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
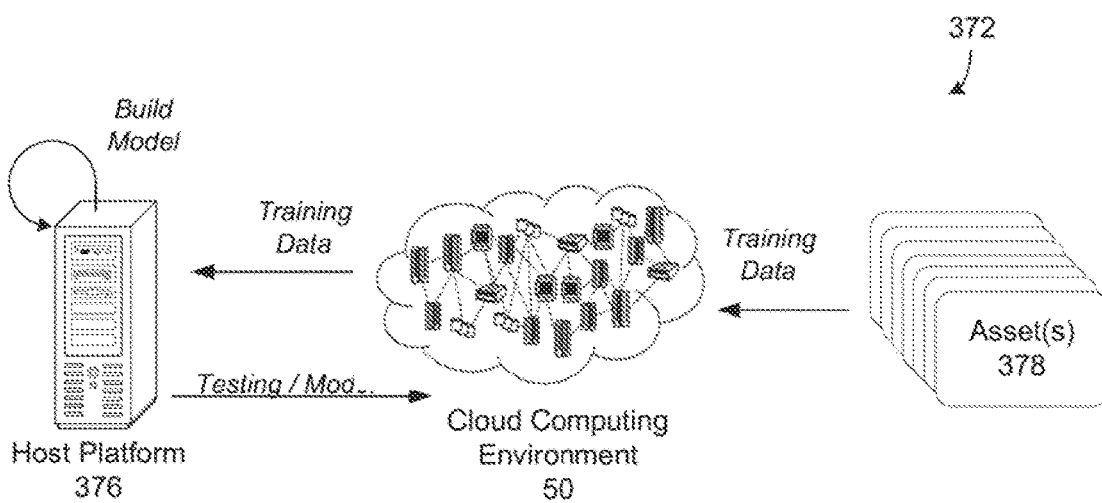
FIG. 3D is a diagram illustrating machine learning process via a cloud computing platform, according to example embodiments.
Figure 3D:
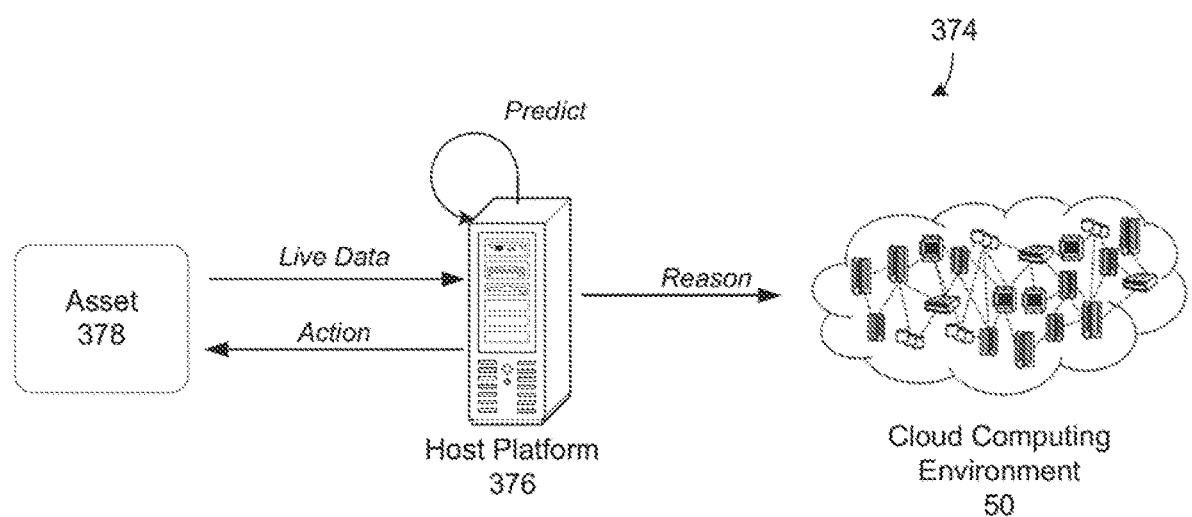
Figure 3E:
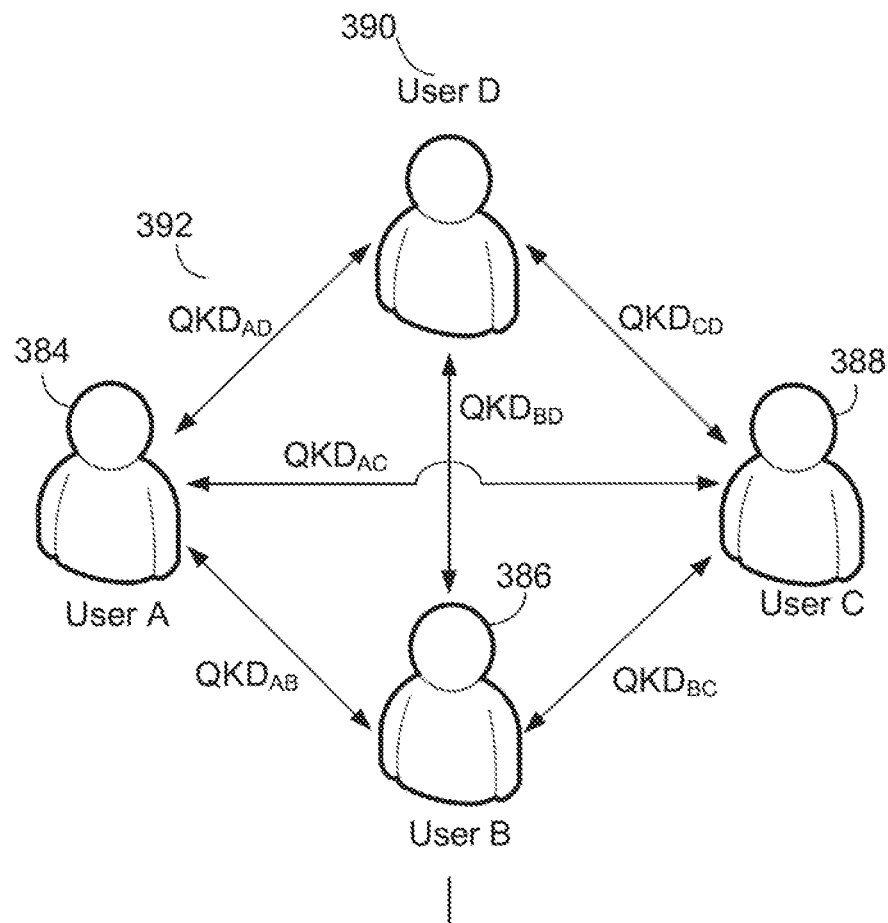
FIG. 3E is a diagram illustrating a quantum computing environment associated with a cloud computing platform, according to example embodiments.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including QKDAB, QKDAC, QKDAD, QKDBC, QKDBD, and QKDCD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

Figure 4A:
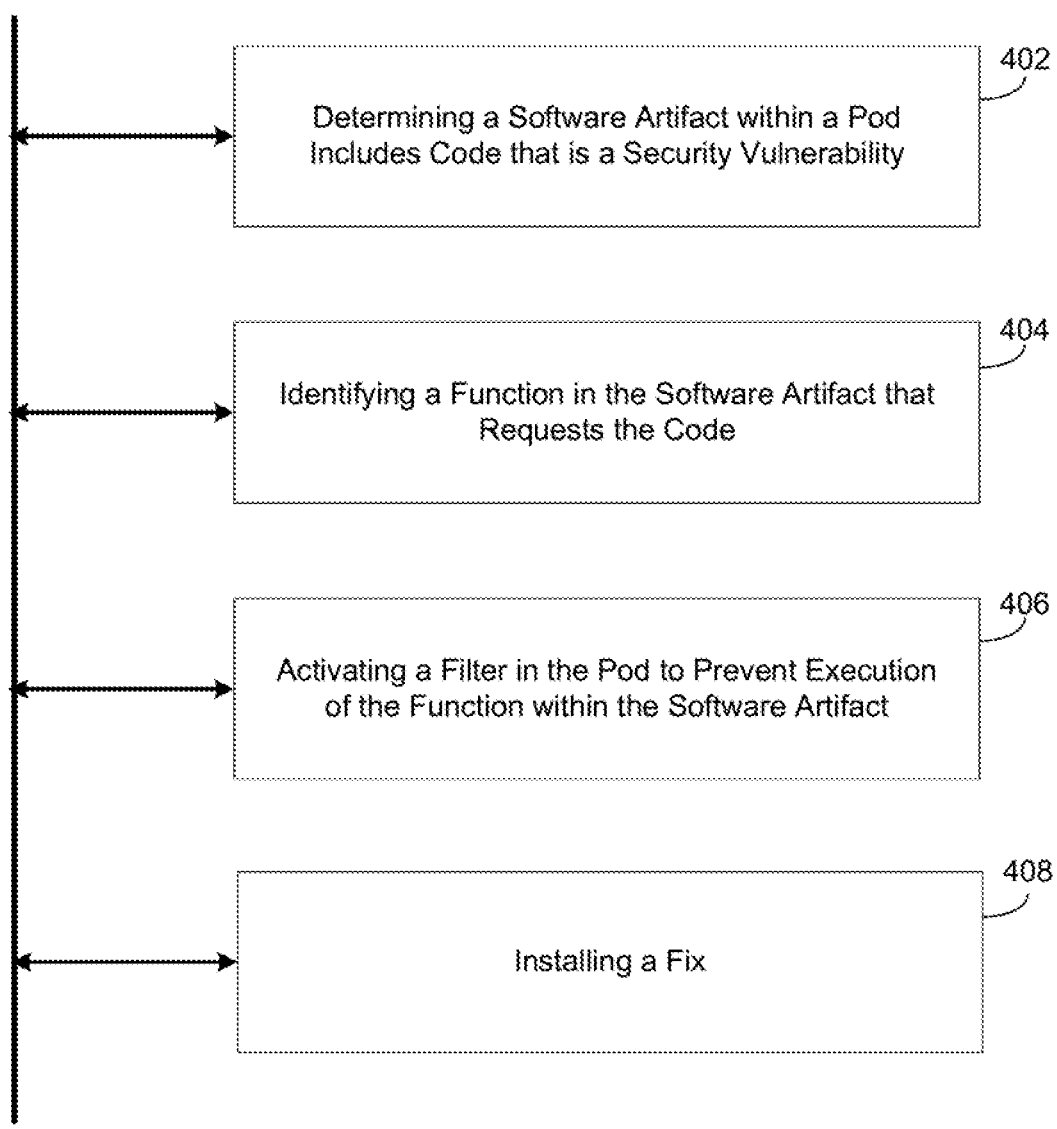
FIG. 4A is a diagram illustrating a method of modifying a vulnerable pod within a cluster on a host platform according to example embodiments.

FIG. 4A illustrates a method 400 for identifying a security vulnerability within a pod of a host platform, according to example embodiments. Referring to FIG. 4A, in step 402, the method may include determining that a software artifact hosted by a pod within a cluster of a host platform contains code that is a security vulnerability. In step 404, the method may include identifying a function within the software artifact that requests the code. In step 406, the method may include activating a filter within the pod of the host platform which prevents execution of the function within the software artifact. In step 408, the method further includes installing a fix for the security vulnerability within the software artifact.

FIG. 4B illustrates a method 410 for identifying a security vulnerability within a pod, according to additional example embodiments. Referring to FIG. 4B, in step 412 the method may include deactivating the filter within the pod in response to installation of the fix for the security vulnerability within the software artifact. In step 414, the method may further include identifying a different pod within the cluster that is capable of executing the function and which does not contain the security vulnerability. In step 416, the method may further include detecting a request for the function of the software artifact, and in response, offloading the request to the different pod within the cluster that is capable of executing the function.

In 418, the filter may include a secure computing mode (SECCOMP) filter that is applied to a kernel of an operating system of the pod. In step 420, the determining may include scanning log data of the pod to identify a version and a name of the software artifact hosted by the pod. In step 422, the determining may further include querying a database based on the version and the name of the software artifact to identify the security vulnerability of the software artifact. In step 424, the method may further include downloading the fix from a software repository associated with an operating system of the pod.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC").

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:
1. An apparatus, comprising:
a memory configured to store computer-executable instructions; and
a processor configured to execute the computer-executable instructions to:
perform a static analysis of a code associated with a software artifact, wherein the software artifact is hosted by a first pod within a cluster of a host platform;
determine, based on the static analysis, that the code comprises a security vulnerability;
identify, based on the determination, a specific function among a plurality of functions within the software artifact, wherein the specific function requests the code;
activate, within the first pod, a filter on the specific function to restrict execution of the specific function while allowing the plurality of functions other than different from the specific function within the software artifact to continue with operations uninterrupted;
identify, based on the activation of the filter, a second pod, different from the first pod, within the cluster, wherein the second pod is capable of execution of the specific function, and the second pod does not contain the security vulnerability;

detect a request for the specific function;

offload, based on the detection of the request, the request to the second pod within the cluster for the execution of the specific function;

install, based on the offload of the request, a fix for the security vulnerability within the software artifact; and deactivate, based on the installation of the fix within the software artifact, the filter within the first pod.

2. The apparatus of claim 1, wherein:

the filter comprises a secure computing mode (SECCOMP) filter, and the processor is further configured to:

apply the SECCOMP filter to a kernel of an operating system of the first pod.

3. The apparatus of claim 1, wherein the processor is further configured to:

scan log data of the first pod; and identify, based on the scanned log data, a version of the software artifact and a name of the software artifact.

4. The apparatus of claim 3, wherein the processor is further configured to:

query, based on the identified version and the identified name, a database to identify the security vulnerability.

5. The apparatus of claim 1, wherein the processor is further configured to:

download the fix from a software repository, wherein the software repository is associated with an operating system of the first pod.

6. A computer-implemented method, comprising:

performing a static analysis of a code associated with a software artifact, wherein the software artifact is hosted by a first pod within a cluster of a host platform;

determining, based on the static analysis, that the code comprises a security vulnerability;

identifying, based on the determination, a specific function among a plurality of functions within the software artifact, wherein the specific function requests the code;

activating, within the first pod, a filter on the specific function to restrict execution of the specific function while allowing the plurality of functions different from the specific function within the software artifact to continue operating uninterrupted;

identifying, based on the activating of the filter, a second pod, different from the first pod, within the cluster, wherein the second pod is capable of execution of the specific function, and the second pod does not contain the security vulnerability;

detecting a request for the specific function;

offloading, based on the detecting of the request, the request to the second pod within the cluster for the execution of the specific function;

installing, based on the offloading of the request, a fix for the security vulnerability within the software artifact; and deactivating, based on the installing of the fix within the software artifact, the filter within the first pod.

7. The computer-implemented method of claim 6, wherein:

the filter further comprises a secure computing mode (SECCOMP) filter, and the computer-implemented method further comprises:

applying the SECCOMP filter to a kernel of an operating system of the first pod.

8. The computer-implemented method of claim 6, wherein the determining further comprises:

scanning log data of the first pod; and identifying, based on the scanning of the log data, a version of the software artifact and a name of the software artifact.

9. The computer-implemented method of claim 8, wherein the determining further comprises:

querying, based on the identified version and the identified name, a database to identify the security vulnerability.

10. The computer-implemented method of claim 6, wherein the computer-implemented method further comprises:

downloading the fix from a software repository, wherein the software repository is associated with an operating system of the first pod.

11. A computer-readable storage medium comprising instructions that, when executed by a processor, cause the processor to perform operations comprising:

performing a static analysis of a code associated with a software artifact, wherein the software artifact is hosted by a first pod within a cluster of a host platform;

determining, based on the static analysis, that the code comprises a security vulnerability;

identifying, based on the determination, a specific function among a plurality of functions within the software artifact, wherein the specific function requests the code;

activating, within the first pod, a filter on the specific function to restrict execution of the specific function while allowing the plurality of functions other than different from the specific function within the software artifact to continue operating uninterrupted;

identifying, based on the activating of the filter, a second pod, different from the first pod, within the cluster, wherein the second pod is capable of execution of the specific function, and the second pod does not contain the security vulnerability;

detecting a request for the specific function;

offloading, based on the detecting of the request, the request to the second pod within the cluster for the execution of the specific function;

installing, based on the offloading of the request, a fix for the security vulnerability within the software artifact; and deactivating, based on the installing of the fix within the software artifact, the filter within the first pod.

* * * * *